(12) United States Patent
Sawai

(10) Patent No.: US 6,412,951 B1
(45) Date of Patent: *Jul. 2, 2002

(54) OPTICAL IMAGE PROJECTOR

(75) Inventor: Yasumasa Sawai, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,631

(22) Filed: Aug. 24, 1998

(30) Foreign Application Priority Data

Aug. 25, 1997 (JP) .............................. 9-228386

(51) Int. Cl.$^7$ .............................. G03B 21/14
(52) U.S. Cl. ..................... 353/31; 353/38; 353/102
(58) Field of Search ..................... 353/31, 34, 33, 353/37, 38, 102; 349/5, 7, 8

(56) References Cited

U.S. PATENT DOCUMENTS

| 4,943,154 A | * | 7/1990 | Miyatake et al. | 353/31 |
| 5,626,409 A | * | 5/1997 | Nakayama et al. | 533/31 |
| 5,786,874 A |   | 7/1998 | Kawamoto et al. | 349/8 |
| 5,865,521 A | * | 2/1999 | Hashizume et al. | 353/31 |
| 5,868,485 A | * | 2/1999 | Fujimori et al. | 353/31 |
| 5,959,778 A |   | 9/1999 | Shimonura et al. | 359/618 |

FOREIGN PATENT DOCUMENTS

| JP | 4-142530 | 5/1992 |
| JP | 4-223456 | 8/1992 |

* cited by examiner

Primary Examiner—William Dowling
(74) Attorney, Agent, or Firm—Sidley Austin Brown & Wood LLP

(57) ABSTRACT

An optical image projector is provided with: a light source, an optical integrator which converges the light from the light source into a number of secondary light sources, a separator which separates each light ray from the secondary light sources into a plurality of color component rays, an optical image generator which generates a plurality of optical images utilizing separated color component rays, an image combiner which combines the plurality of optical images into a single optical image, and an optical system provided between the optical integrator and the image combiner such that the most intensive light rays strike the image combiner at a predetermined incident angle. The optical system includes a lens whose focal length f1 satisfies:

$$\{(D+d)/D\} \cdot L \leq f1 \leq \{D/(D-d)\} \cdot L$$

wherein d denotes an interval between secondary light sources formed in the vicinity of a center optical axis of the optical integrator, D denotes a dimension of an area to be illuminated and, L denotes a distance between the optical integrator and the lens.

13 Claims, 9 Drawing Sheets

OPTICAL IMAGE PROJECTOR

This application is based on patent application No. 9-228386 filed in Japan, the contents of which is hereby incorporated by reference.

BACKGROUND OF THE INVENTION

This invention relates to an optical image projector of the ray splitting type or light mixing type for projecting an optical image, which is used, for example, in a projector for displaying a color video image and adopts a dichroic mirror.

As one kind of optical image projector, there have been marketed liquid crystal projectors. A liquid crystal projector acts as a means for displaying a large image and enlargedly projects an optical image from liquid crystal panels which is obtained by modulating the luminance of illumination light in accordance with a video signal on a screen via a projection lens.

The construction of such a liquid crystal projector is described with reference to FIG. 8. In FIG. 8, light irradiated from an illumination optical system 51 is split into rays in three wavelength ranges of R (red), G (green) and B (blue) by dichroic mirrors 52, 53.

Specifically, a ray in the wavelength range of R reflected by the dichroic mirror 52 illuminates a liquid crystal panel 56 for R after being reflected by a full-reflection mirror 54 and transmitting through a field lens 55. Rays in the wavelength ranges of G and B transmit through the dichroic mirror 52. Thereafter, the ray in the wavelength range of G illuminates a liquid crystal panel 58 for G after being reflected by the dichroic mirror 53 and transmitting through a field lens 57. Further, the ray in the wavelength range of B illuminates a liquid crystal panel 64 after transmitting through the dichroic mirror 53, being introduced to a relay optical system including two lenses 59, 60 and two full-reflection mirrors 61, 62 and then transmitting through a field lens 63.

Further, optical images of the respective colors formed by the three liquid crystal panels 56, 58, 64 are combined into one image by a dichroic prism 65.

Specifically, the optical image of R formed by the liquid crystal panel 56 is incident on the dichroic prism 65, propagates straight therein and is reflected at right angles by a first dichroic coating surface 65a after being incident thereon at 45° to emerge toward the projection lens 66. Further, the optical image of G formed by the liquid crystal panel 58 is incident on the dichroic prism 65, propagates straight therein without being reflected by the first and second dichroic coating surfaces 65a, 65b to emerge toward the projection lens 66. Furthermore, the optical image of B formed by the liquid crystal panel 64 is incident on the dichroic prism 65, propagates straight therein and is reflected at right angles by the second dichroic coating surface 65b after being incident thereon at 45° to emerge toward the projection lens 66.

As described above, the optical images of the respective colors formed by the three liquid crystal panels 56, 58, 64 for R, G, B are caused to emerge toward the projection lens 66 after being combined by the dichroic prism 65 with an optical axis and the directions of the optical images aligned. The combined optical image is enlargedly projected on the screen via the projection lens 66.

In the case that an optical integrator including first and second lens arrays is used as the illumination optical system 51, the first lens array splits light from a light source and incident thereon into a plurality of rays by a plurality of lenses thereof, and a plurality of rays from the first lens array are projected on the display surfaces of the respective liquid crystal panels 56, 58, 64 in a superposed manner by the second lens array.

However, in the above conventional liquid crystal projector, the rays incident on the first and second dichroic coating surfaces 65a, 65b are not necessarily completely parallel. This results in color nonuniformity.

In FIG. 9, the construction of FIG. 8 is simplified in order to simplify the following description. In other words, a typical arrangement of the first and second dichroic mirrors 52, 53 is provided between the field lens 57 and a second lens array 72 for introducing the rays to the liquid crystal panel 58 for G, so that the rays from the second lens array 72 can transmit through both the first and second dichroic mirrors 52, 53.

As shown in FIG. 9, the liquid crystal panel 58 for G is telecentrically illuminated via the field lens 57 by setting an angle distribution of the rays from a plurality of secondary light source images 73 formed in the vicinity of the first lens array 72 by a plurality of lenses of the first lens array 71 within a specified range. Assuming that L denotes a distance between the second lens array 72 and the field lens 57, a focal length f1 of the field lens 57 is set at L in order to ensure the telecentric illumination. A most intensive ray a1 which is from point a in the position of an aperture of the first lens array 71 and is at the center of an intensity distribution of light energy which contributes most to the projected image is incident on the dichroic prism 65 as converged light although it should be perpendicularly incident on the display surface of the liquid crystal panel 58, i.e., should be incident on the dichroic coating surfaces 65a, 65b of the dichroic prism 65 at 45° In other words, at points A, B located at opposing ends of the liquid crystal panel 58, the most intensive ray a1 contributing most to the projected image and located at the center of the intensity distribution of light energy is incident on the dichroic coating surfaces 65a, 65b at 45° ±α. Thus, wavelengths to be cut off by the dichroic coating surfaces 65a, 65b are shifted due to an incident angle dependency of the cutoff values of the dichroic coating surfaces 65a, 65b. As a result, the color is differed in positions of the projected image corresponding to points A and B, causing a color nonuniformity in the projected image.

The cutoff values of the dichroic coating surfaces 65a, 65b have incident angle dependencies. Thus, if the cutoff value for an incident angle of 45° is set at 580 nm for the entire dichroic coating surface 65a, the cutoff value is shifted as much as the incident angle is shifted. Then, as shown in FIG. 10, points of inflection of the spectral distribution of the projected light shift between the opposite ends (left and right ends) of the screen, which causes a color nonuniformity. As a result, the color becomes nonuniform in the projection screen.

Japanese Unexamined Patent Publication No. 4-142530 discloses a projection type liquid crystal display device using a coating of a varying thickness. In this device, a wavelength selecting characteristic in each position is made equal by changing the wavelength selecting characteristic of a dielectric multi-layered coating of a dichroic prism for the image combination according to an inclination of a main ray to a projection lens, thereby avoiding the creation of color nonuniformity in a projected image. Such a method using the coating of a varying thickness also has the problem of a difficult maintenance of the coating characteristics.

Also, Japanese Unexamined Patent Publication No. 4-223456 discloses a projection type liquid crystal display device additionally including a trimming filter. In this device, there are provided a dichroic mirror for selectively transmitting or reflecting a light at a specified wavelength, a first optical device constructed by a dichroic prism for the image combination, and a trimming filter as a second optical device for cutting off light components in a wavelength range corresponding to a change in the incident angle of a light on the first optical device such that a wavelength range of the transmitted light or reflected light falls within a specified region even if the incident angle of the light on the first optical device varies. Accordingly, a projected image free from color nonuniformity and having high color purity can be reproduced on a screen in color separation and color combination. However, such a method with an additional trimming filter requires an additional coating surface, increasing the number of parts, and more maintenance for the coatings. Thus, the coating maintenance becomes more difficult and a production cost increases.

SUMMARY OF THE INVENTION

It is an object of the present invention to provide an optical image projector which has overcome the problems residing in the prior art.

According to an aspect of the present invention, an optical image projector comprises: an illuminator which emits a number of light rays; a separator which separates each light ray from the illuminator into a plurality of color component rays having different wavelengths from one another; an optical image generator which generates a plurality of optical images utilizing separated color component rays; an image combiner which combines the plurality of optical images into a single optical image; and an optical system which is provided between the illuminator and the image combiner such that the most intensive light rays strike the image combiner at a predetermined incident angle.

According to another aspect of the present invention, an optical image projector comprises: a light source which irradiates light; an optical integrator which converges the light from the light source into a number of secondary light sources; a separator which separates each light ray from the secondary light sources into a plurality of color component rays having different wavelengths from one another; an optical image generator which generates a plurality of optical images utilizing separated color component rays; an image combiner which combines the plurality of optical images into a single optical image; and an optical system which is provided between the optical integrator and the image combiner such that the most intensive light rays strike the image combiner at a predetermined incident angle, the optical system including a lens whose focal length f1 satisfies the condition defined by the following equation:

$$\{(D+d)/D\} \cdot L \leq f1 \leq \{D/(D-d)\} \cdot L$$

wherein d denotes an interval between secondary light sources formed in the vicinity of a center optical axis of the optical integrator, D denotes a dimension of an area to be illuminated, L denotes a distance between the optical integrator and the lens.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
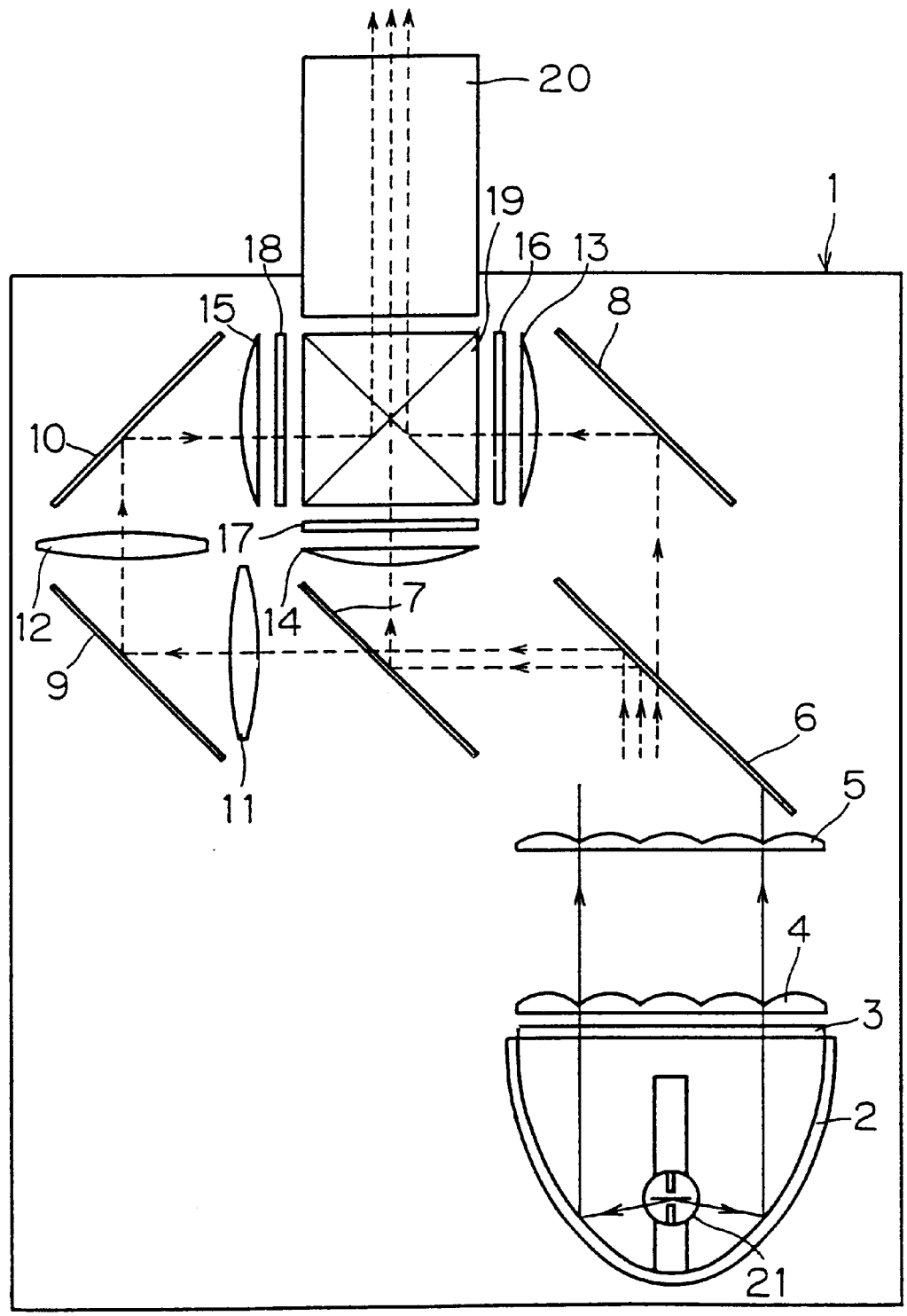
FIG. 1 is a diagram showing a schematic construction of a liquid crystal projector according to a first embodiment of the invention.

FIG. 1 shows a liquid crystal projector 1 according to a first embodiment of the invention. In FIG. 1, the liquid crystal projector 1 includes, on an optical path of light irradiated from a light source 21, a reflector 2, an IR (infrared)-UV (ultraviolet) cutoff filter 3, first and second lens arrays 4, 5, an R-transmitting dichroic mirror 6, a B-transmitting dichroic mirror 7, deflecting mirrors 8, 9, 10, a condenser lens 11, a relay lens 12, a field lens 13 for R (red), a field lens 14 for G (green), a field lens 15 for B (blue), transmission type liquid crystal panels 16, 17, 18 for displaying a red image, a green image and a blue image, respectively, a dichroic prism 19 and a projection lens 20.

The reflector 2 reflects the light from the light source 21. The filter 3 is arranged at a front opening of the reflector 2 for cutting off light components in an infrared spectrum and an ultraviolet spectrum and for transmitting light components in a visible spectrum. Each of the first and second lens arrays 4, 5 is such that a plurality of lenses are arrayed in a two-dimensional manner and constitutes an optical integrator. The dichroic mirror 6 transmits rays in the wavelength range for R while reflects the other rays. The dichroic mirror 7 transmits rays in the wavelength range for B while reflects the other rays. The deflecting mirrors 8, 9, 10 deflects the optical path of the light from the light source 21 by 90° The dichroic prism 19 acts as an optical image combining means to combine optical images of the respective colors. The projection lens 20 projects the combined optical image on a screen.

The light source 21 can be a metal halide lamp for irradiating white light as well as a xenon lamp or a halogen lamp. The inner surface of the reflector 2 is made of a hyperbolic reflecting mirror. The reflector 2 reflects the light from the light source 21 placed in a focusing position of the hyperbolic reflecting mirror by its inner surface, thereby making it into parallel light to be directed to the IR-UV filter 3.

The first lens array 4 includes a plurality of lenses arrayed in a two-dimensional manner for making the light from the light source 21 incident thereon into a plurality of rays. Further, the second lens array 5 projects each of a plurality of rays from the first lens array 4 on the respective display surfaces of the liquid crystal panels 16, 17, 18 for the respective colors in a superposing manner to eliminate a luminance difference in a center portion and a peripheral portion of each of the display surfaces of the liquid crystal panels 16, 17, 18, thereby making the luminance uniform.

The R-transmitting and B-transmitting dichroic mirrors 6 and 7 constitute a color separation optical system. Red rays in the wavelength range of R are transmitted by the R-transmitting dichroic mirror 6 having a cutoff value at a wavelength of 580 nm. Green rays in the wavelength range of G are obtainable by being reflected by the R-transmitting dichroic mirror 6 and further reflected by the B-transmitting dichroic mirror 7 having a cutoff value at a wavelength of 510 nm. Blue rays in the wavelength range of B are transmitted by the B-transmitting dichroic mirror 7. In this way, the rays of R, G, B can be obtained by separating rays from the second lens array 5.

The condenser lens 11 and the relay lens 12 constitute a relay optical system for introducing the blue rays having a long optical path to the liquid crystal panel 18 for B while maintaining the illuminance thereof.

The field lenses 13, 14, 15 for R, G, B are adapted to telecentrically project the rays of the respective colors separated by the R-transmitting and B-transmitting dichroic mirrors 6 and 7 onto the respective display surfaces of the liquid crystal panels 16, 17, 18.

The respective liquid crystal panels 16, 17, 18 for R, G, B project image rays of the corresponding colors obtained by luminance-modulating the illumination color rays in accordance with video signals of the respective colors.

The dichroic prism 19 combines the rays of the at respective colors telecentrically projected by the field lenses 13, 14, 15, thereby combining the image rays of the respective colors transmitted by the respective display surfaces of the liquid crystal panels 16, 17, 18.

Figure 2:
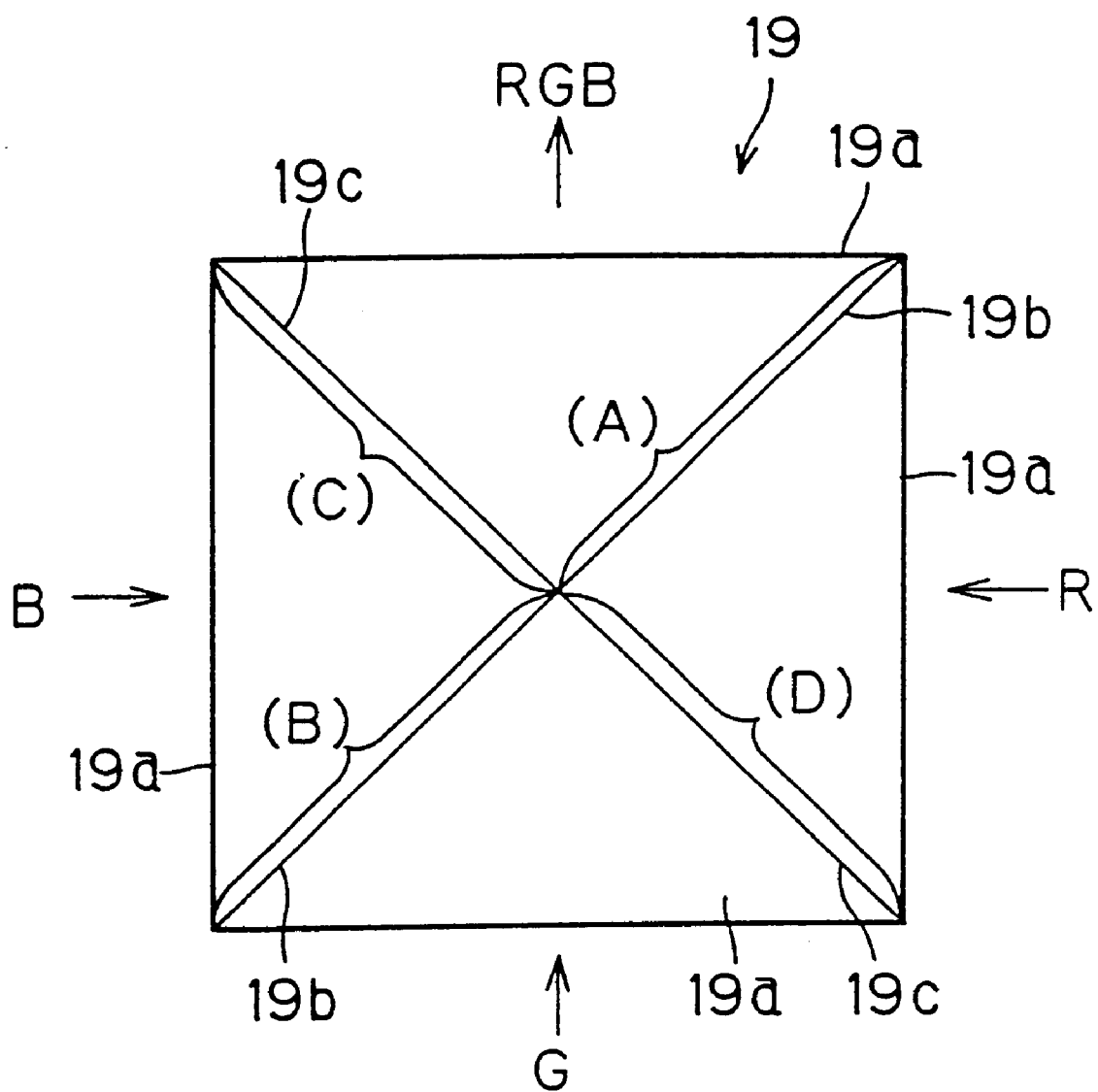
FIG. 2 is an enlarged view of a dichroic prism used in the liquid crystal projector shown in FIG. 1.

The dichroic prism 19 includes four right-angle prisms 19a which are so joined as to have a cubic or rectangular parallelepipedic shape as shown in FIG. 2. At the junctions of the right-angle prisms 19a are formed a first dichroic coating surface 19b for transmitting the optical images of R and G and reflecting the optical image of B, and a second dichroic coating surface 19c for reflecting the optical image of R having been incident thereon at 45° at right angles and transmitting the optical images of G and B. In portions (A) and (B) of the first dichroic coating surface 19b, the cutoff value is 510 nm. In portions (C) and (D) of the second dichroic coating surface 19c, the cutoff value is 580 nm.

Figure 3:
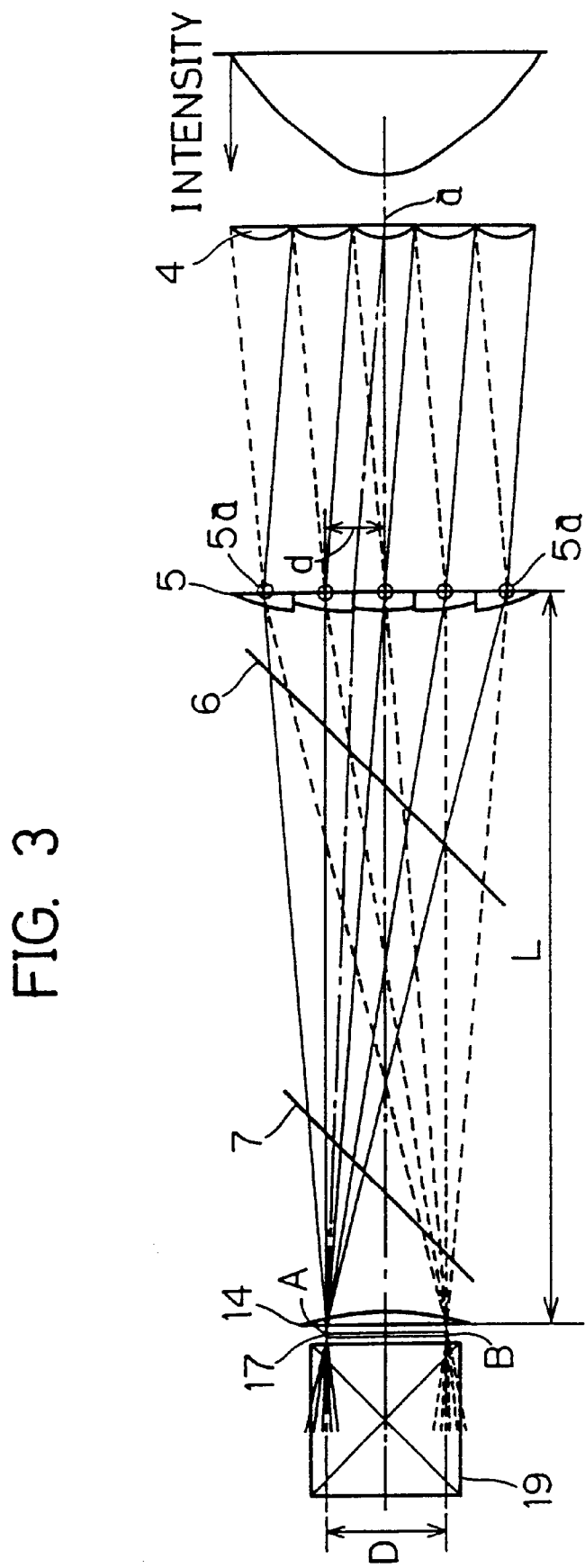
FIG. 3 is a diagram showing an arrangement of essential optical systems in the liquid crystal projector shown in FIG. 1.
Figure 4A:
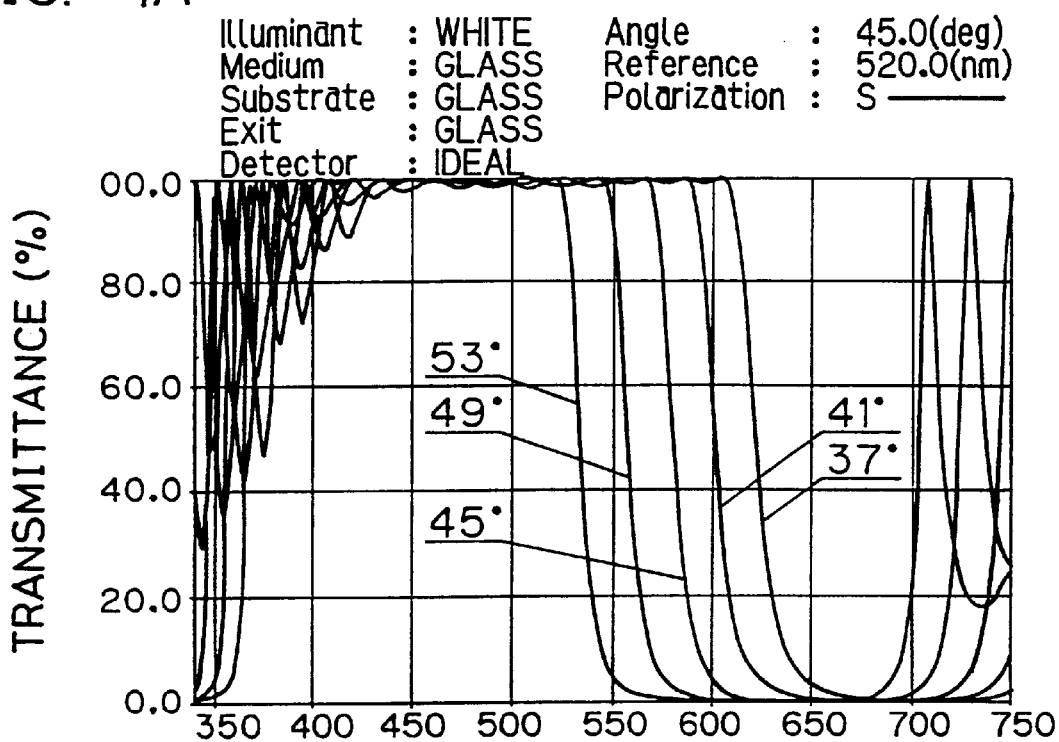
FIGS. 4A and 4B are graphs showing incident angle characteristics of a dichroic coating surface of the dichroic prism.
Figure 4B:
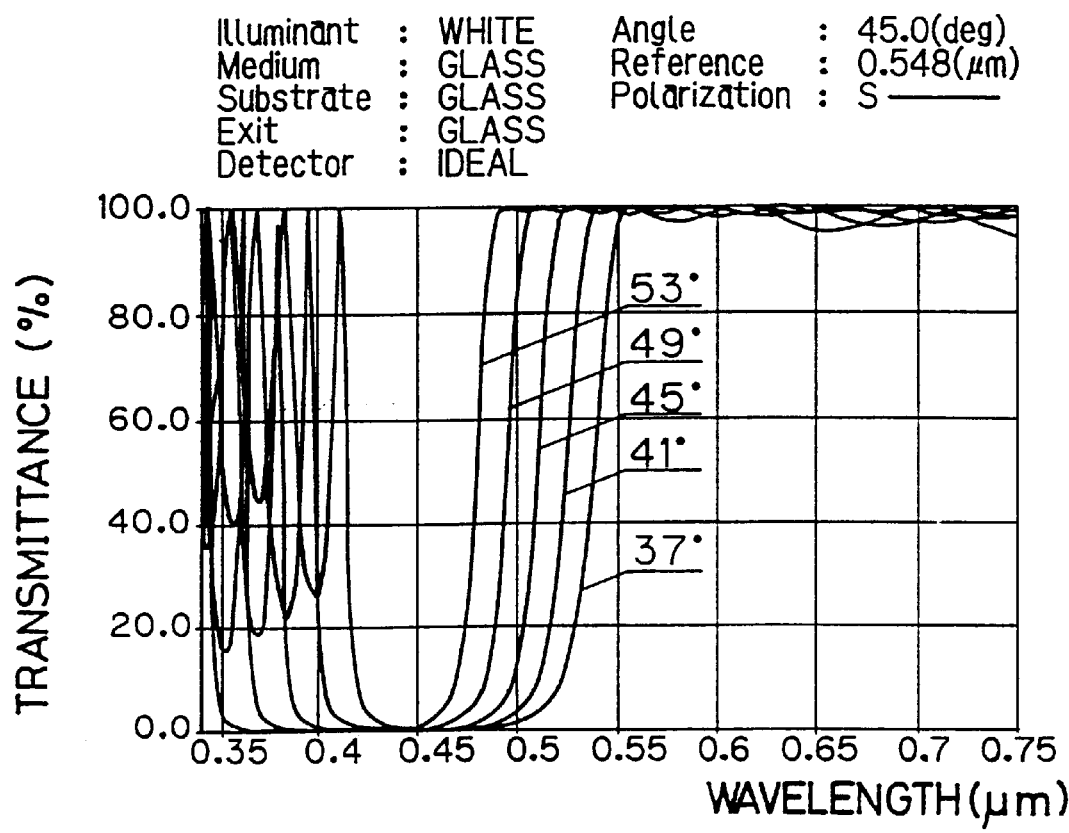

In order to simplify the description, FIG. 3 shows an example which assumes that the dichroic mirrors 6, 7 are arranged between the field lens 14 and the second lens array 5 for introducing the rays to the liquid crystal panel 17 for G and the rays from the second lens array 5 transmit to both dichroic mirrors 6 and 7.

The focal lengths f1 of the respective field lenses 13, 14, 15 are set so as to satisfy a condition defined by following Equation (1) assuming that d denotes an interval between a plurality of secondary light sources 5a formed in the vicinity of a center optical axis of the second lens array 5, i.e., a spacing of these secondary light sources 5a in a direction parallel to the direction of color combination, D denotes a dimension of an area to be illuminated in a direction parallel to the direction of color combination, L (e.g., in the case of the field lens 14) denotes a distance between the second lens array 5 and the field lens 14.

At this time, the relay optical system is arranged in the middle of the optical path of the field lens 15. Accordingly, the focal length f1 of the field lens 15 is longer than those of the field lenses 13, 14. For the field lens 15, the focal length f1 is set such that the rays emerging from the field lens 15 behave substantially in the same manner as those emerging from the field lenses 13, 14. In other words, the focal length f1 of the field lens 15 is so set as to satisfy the condition of Equation (1) in a system including the relay optical system.

$$\{(D+d)/D\} \cdot L \leq f1 \leq \{D/(D-d)\} \cdot L \qquad (1)$$

Specifically, the focal lengths f1 of the field lenses 13, 14, 15 are set such that rays a at the aperture of the first lens array 4 and at the center of a light intensity distribution are incident on the dichroic coating surfaces 19b, 19c of the dichroic prism 19 at 45°, so that the rays of the respective colors emerged from the field lenses 13, 14, 15 are perpendicularly incident on the respective display surfaces of the liquid crystal panels 16, 17, 18 and become parallel rays to each other.

For example, if the focal length f1 of the field lens 14 is $\{D/(D-d)\} \cdot L$, the rays a from the energy center at the aperture of the first lens array 4 become parallel rays and are incident on the dichroic prism 19. At this time, the rays from point A of the liquid crystal panel 17 and the rays from point B thereof are influenced by the dichroic coating surfaces 19b, 19c substantially in the same manner, with the result that a likelihood of color nonuniformity in the projected image can be suppressed. In this way, the degree of color nonuniformity on the screen due to the dichroic coating surfaces 19b, 19c of the dichroic prism 19 can be reduced by lengthening the focal length f1 of the field lens 14 for telecentrically illuminating the liquid crystal panel 17.

However, if the focal length f1 of the field lens 14 is $\{D/(D-d)\} \cdot L$, an angle distribution of the rays is slightly shifted from that of the telecentric illumination. Depending upon the optical characteristics of the projection lens 20, the illumination light is slightly eclipsed, causing a light amount loss. Accordingly, the focal length f1 of the field lens 14 needs to be shorter than $\{D/(D-d)\} \cdot L$. Thus, in reality, the respective focal lengths f1 of the field lenses 13, 14, 15 need to be set between L where the angle discrimination of the rays is telecentric and $\{D/(D-d)\} \cdot L$.

However, the effect of suppressing the likelihood of color nonuniformity is small unless the focal length f1 of the field lens 14 is longer than $\{(D+d)/D\} \cdot L$. Therefore, the liquid crystal projector is constructed such that the focal lengths f1 of the field lenses 13, 14, 15 satisfy the condition defined by Equation (1).

With the above construction, the light from the light source is first split into a plurality of rays by the first lens array 4 and the split rays are projected on the respective display surfaces of the transmission type liquid crystal panels 16, 17, 18 while being superposed each other by the second lens array 5.

At this time, after a plurality of rays from the second lens array 5 are color-separated into rays of R, G, B by the dichroic mirrors 6, 7 as a color separation optical system, the separated rays of R, G, B are projected to the corresponding liquid crystal panels 16, 17, 18 via the field lenses 13, 14, 15.

Subsequently, the images of the respective colors having been transmitted by the display surfaces of the liquid crystal panels 16, 17, 18 are combined by the dichroic prism 19 and are enlargedly projected onto the screen by the projection lens 20.

At this time, since the most intensive rays in the light energy intensity distribution of the light from the light source are incident on the dichroic prism 19 at a specified incident angle, the rays will not be influenced by the incident angle dependency of the cutoff value of the coating surface if the focal lengths f1 of the field lenses 13, 14, 15 are set such that the most intensive rays most contributing to the projected image and at the center of the light energy intensity distribution are incident on the coating surface of the dichroic prism 19 at 45°. Thus, the color nonuniformity of the projected image can be suppressed without making the maintenance of the coating characteristic difficult and increasing the number of parts as in the conventional device.

Specifically, since the focal lengths f1 of the field lenses 13, 14, 15 are set in a range of $\{(D+d)/D\}\cdot L \leq f1 \leq \{D/(D-d)\}\cdot L$ which is longer than a usual set length L, an incident angle difference caused by the dichroic surface is reduced. Thus, the rays a from the energy center at the aperture of the first lens array 4 become substantially parallel rays and are incident on the dichroic prism 19. Therefore, the rays from point A of the liquid crystal panel 17 and the rays from point B thereof are influenced by the dichroic coating surfaces 19b, 19c substantially in the same manner, with the result that a likelihood of color nonuniformity in the projected image can be suppressed without making maintenance of the coating characteristic difficult and increasing the number of parts such as a cutoff filter for preventing a color nonuniformity as in the prior art.

Figure 5:
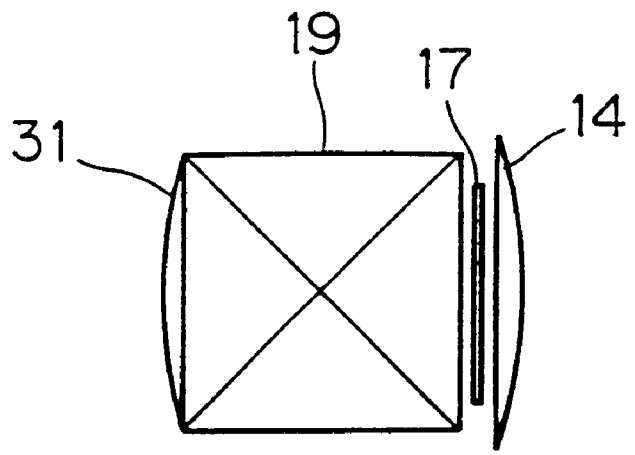
FIG. 5 is a diagram showing a construction of an essential portion of a liquid crystal projector according to a second embodiment of the invention.

In a second embodiment shown in FIG. 5, a convex lens 31 is provided at an emerging side of the dichroic prism 19 in order to make an angle distribution of the rays telecentric. This has an advantageous effect of a good compatibility with the telecentric projection lens 20. This telecentric convex lens 31 has an effect that an optimal illumination condition can be maintained even if it is shifted in a direction normal to the optical axis thereof to move the position of the projected image.

Figure 6:
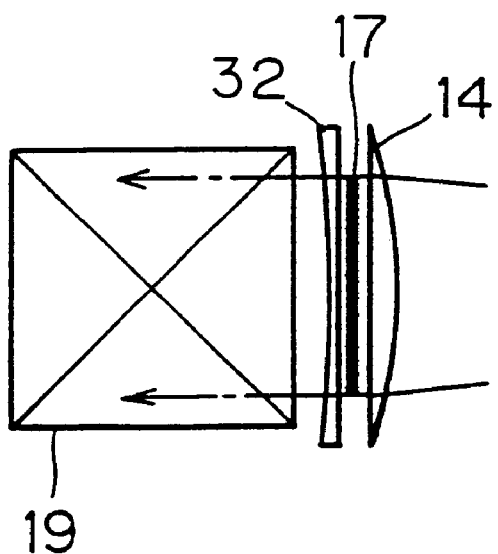
FIG. 6 is a diagram showing a construction of an essential portion of a liquid crystal projector according to a third embodiment of the invention.

In a third embodiment shown in FIG. 6, a concave lens 32 is additionally provided, for example, between the field lens 14 and the dichroic prism 19. Further, if the concave lens 32 is provided at the emerging side of the liquid crystal panel 17, the angle distribution of the rays is more telecentric in the liquid crystal panel 17. This is more effective when the liquid crystal panel 17 used has a strict incident angle characteristic.

Figure 7:
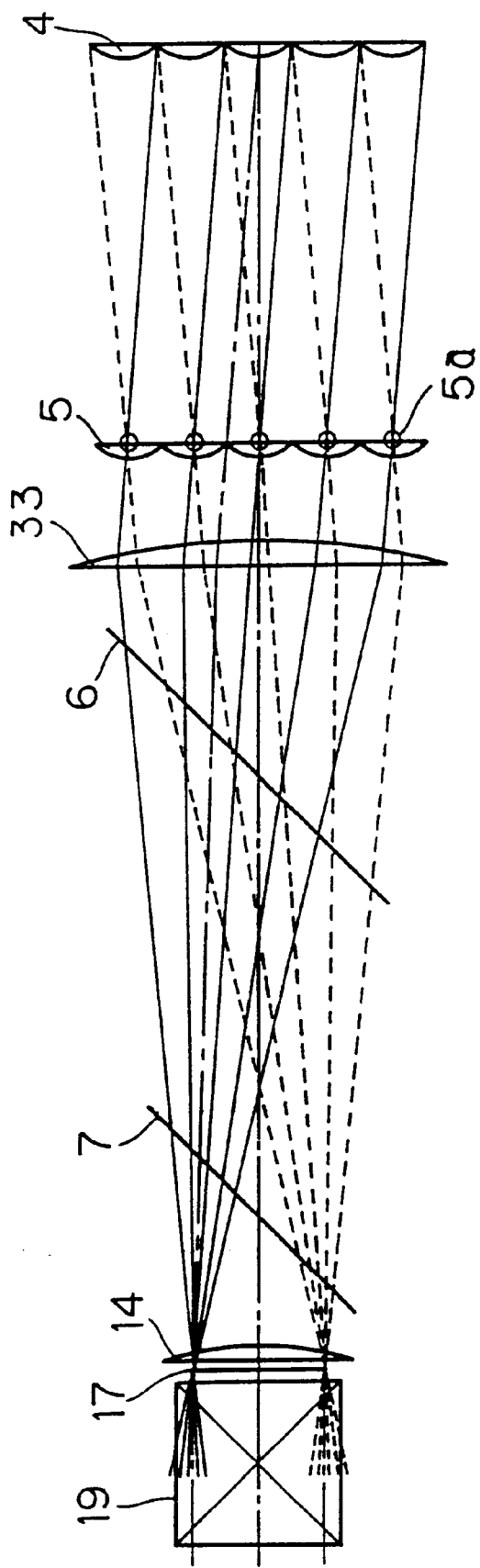
FIG. 7 is a diagram showing a construction of an essential portion of a liquid crystal projector according to a fourth embodiment of the invention.
Figure 8:
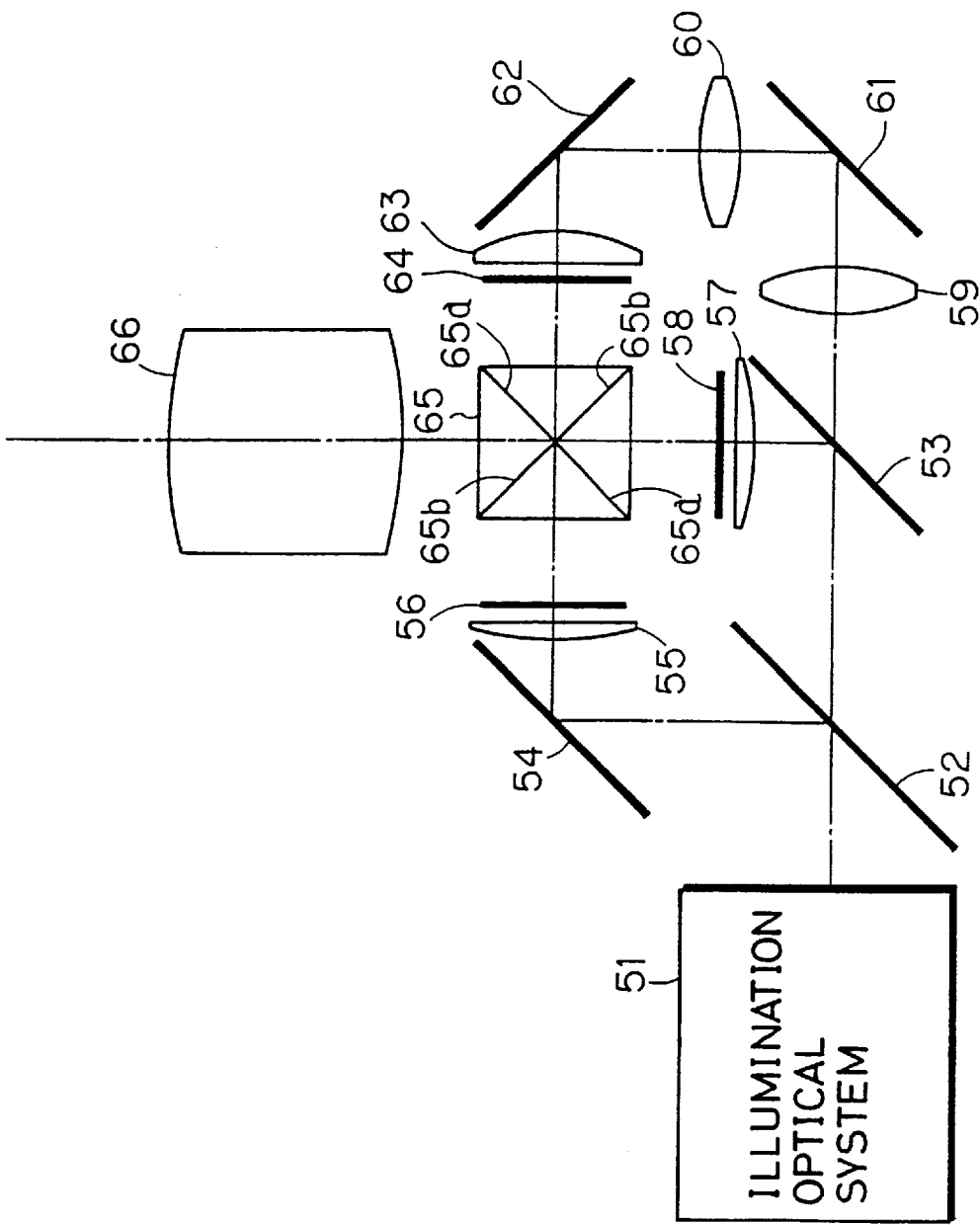
FIG. 8 is a diagram showing a construction of a conventional liquid crystal projector.
Figure 9:
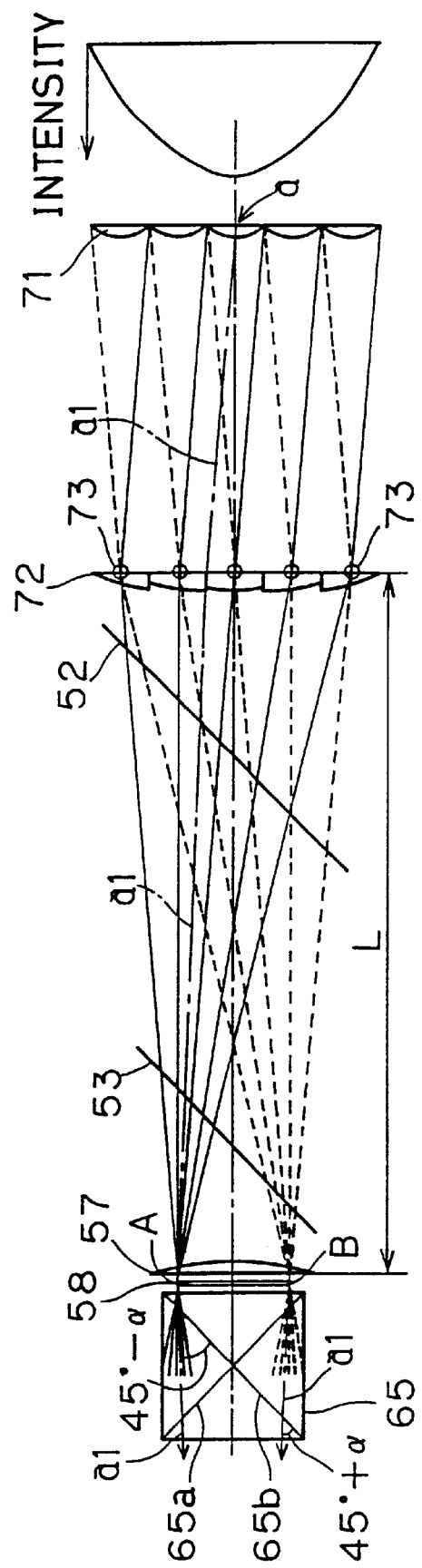
FIG. 9 is a diagram showing an arrangement of essential optical systems in the conventional liquid crystal projector shown in FIG. 8.
Figure 10:
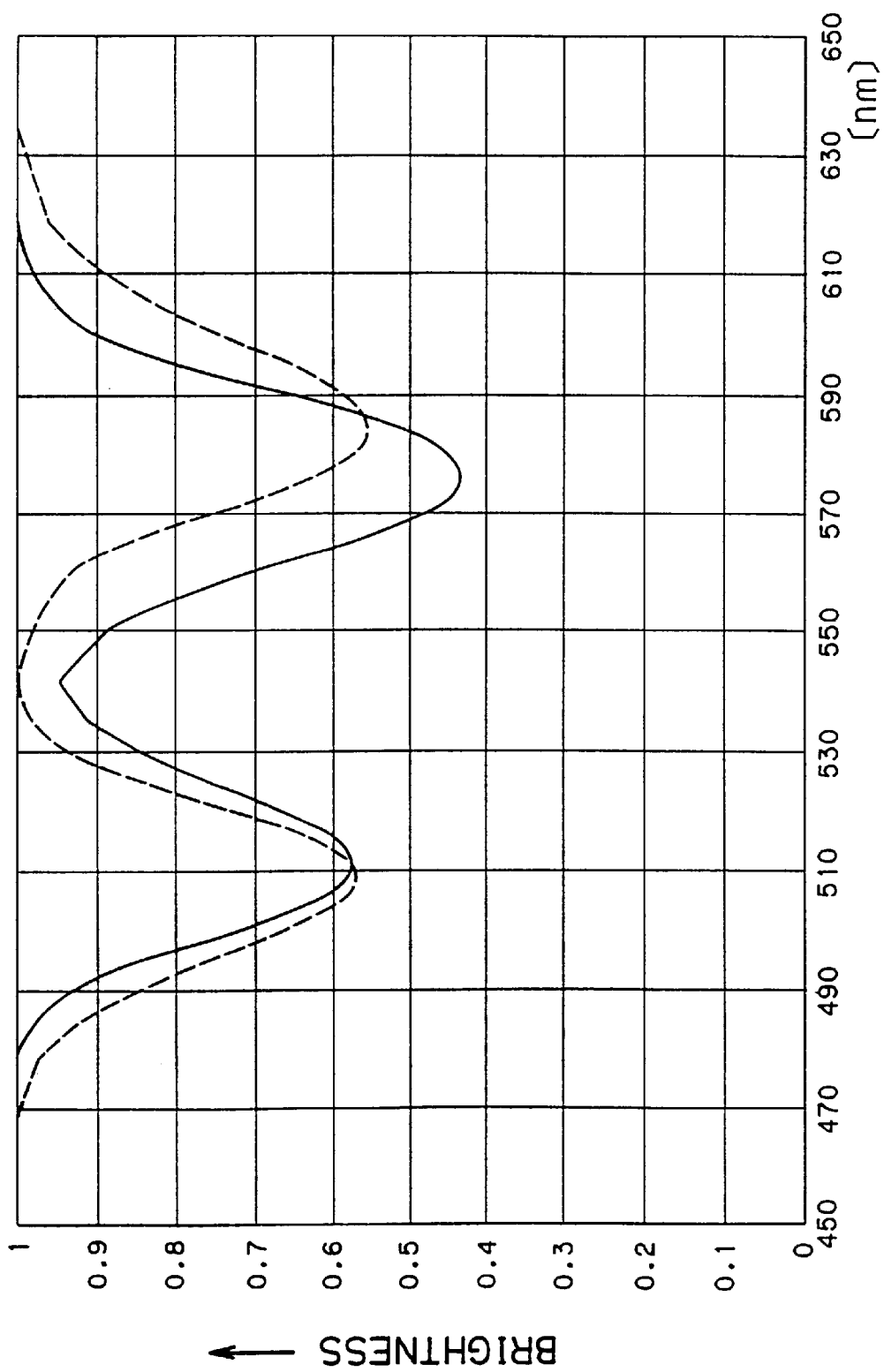
FIG. 10 is a characteristic diagram showing a brightness of the liquid crystal projector of FIG. 8 in relation to wavelength.

In a fourth embodiment shown in FIG. 7, a lens function of the second lens array 5 is divided and used together with a superposition lens 33. This brings an advantage that the lenses can be more easily and inexpensively manufactured since the focal length can be set by an optical system including the field lens 14 and the superposition lens 33.

As described above, most intensive rays in the energy intensity distribution of the light from the light source are incident on the optical image combiner at a specified incident angle. Accordingly, if the focal length of the lens is set such that the most intensive rays at the center of the light energy intensity distribution which contribute most to the projected image are incident on, e.g., the coating surface of the optical image combiner at 45° there is no influence of the incident angle dependency of the cutoff value of the coating surface. Therefore, the color nonuniformity of the projected image can be suppressed without making the maintenance of the coating characteristic difficult and increasing the number of parts as in the prior art.

Further, since the focal length f1 of the field lenses are set within a range of $\{(D+d)/D\}\cdot L \leq f1 \leq \{D/(D-d)\}\cdot L$ longer than the usual set length L, the rays from the center of the energy distribution at the aperture of the first lens array are incident as parallel rays on the dichroic prism, and the rays from one end of the liquid crystal panel and the rays from the other end are influenced in substantially the same manner by the dichroic coating surface. Therefore, the color nonuniformity of the projected image can be suppressed without making the maintenance of the coating characteristic difficult or increasing the number of parts such as a cutoff filter for preventing a color nonuniformity as in the prior art.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical image projector for illuminating an area with an optical image, the area having a dimension D, the optical image projector comprising:

a light source for radiating light;

an optical integrator for converging light from said light source into a plurality of secondary light sources, said optical integrator having an optical axis wherein the secondary light sources are spaced apart from the optical axis by intervals of a distance d;

a separator for separating light rays from the secondary light sources into a plurality of color component rays having different wavelengths from one another;

an optical image generator for generating a plurality of optical images utilizing said color component rays;

an image combiner for combining said plurality of optical images into a single optical image; and an optical system positioned with respect to said optical integrator and said image combiner such that light rays having greatest intensity strike the image combiner at a predetermined incident angle, the optical system including a lens having a focal length f1 and satisfying the condition defined in the following equation:

$$\{(D+d)/D\}\cdot L \leq f1 \leq \{D/(D-d)\}\cdot L$$

wherein L denotes a distance between said optical integrator and said lens.

2. An optical image projector according to claim 1, wherein the separator comprises a dichroic mirror.

3. An optical image projector according to claim 1, wherein the optical image generator comprises a transmission type liquid crystal panel.

4. An optical image projector according to claim 1, wherein the image combiner comprises a dichroic prism.

5. An optical image projector according to claim 1, wherein the separator separates each light ray into a red ray, a green ray, and a blue ray.

6. An optical image projector according to claim 1, wherein the optical system comprises a field lens having a positive power.

7. An optical image projector according to claim 1, wherein said separator is for separating the light rays from said secondary light sources into color component rays of three different colors, and wherein said optical image generator comprises three transmission type liquid crystal panels, each of said transmission type liquid crystal panels being positioned to initialize the color components rays of a respective one of said three different colors.

8. An optical image projector comprising:

an illuminator for emitting light rays;

an optical integrator for converging light rays from said illuminator into a plurality of secondary light sources;

a separator for separating the light rays from said plurality of secondary light sources into a plurality of color component rays having different wavelengths from one another;

an optical image generator for generating a plurality of optical images utilizing said color component rays;

an image combiner for combining said plurality of optical images into a single optical image; and an optical system positioned with respect to said illuminator and said image combiner such that light rays having greatest intensity strike said image combiner at a predetermined incident angle, wherein said optical system comprises a field lens having a focal length that is greater than a distance between said field lens and said plurality of secondary light sources.

9. An optical image projector according to claim 8, wherein the separator comprises a dichroic mirror.

10. An optical image projector according to claim 8, wherein the optical image generator comprises a transmission type liquid crystal panel.

11. An optical image projector according to claim 8, wherein the image combiner comprises a dichroic prism.

12. An optical image projector according to claim 8, wherein the separator separates each light ray into a red ray, a green ray, and a blue ray.

13. An optical image projector according to claim 8, wherein the field lens has a positive power.

* * * * *